WALTER J. NORLANDER
INVENTOR.

July 5, 1949.  W. J. NORLANDER  2,475,456
MAGNETIC WORK HOLDER
Filed Aug. 24, 1944  2 Sheets-Sheet 2
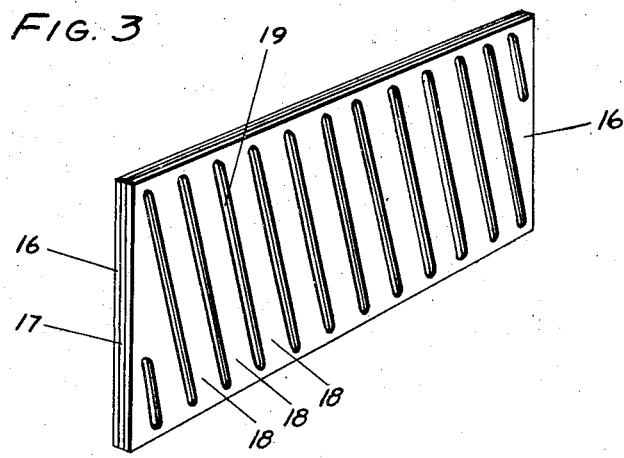
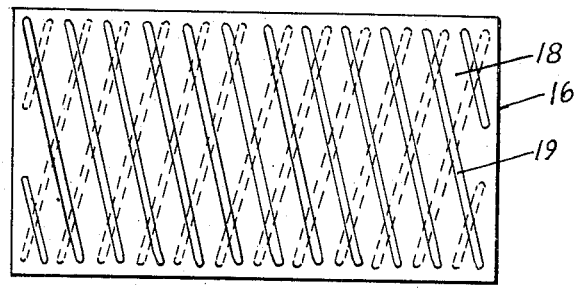
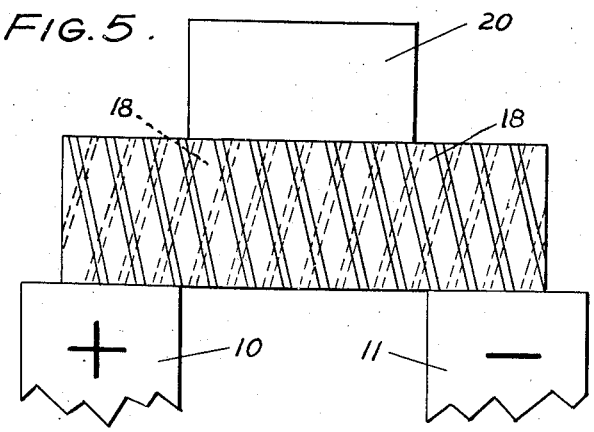
WALTER J. NORLANDER
INVENTOR.

Patented July 5, 1949

2,475,456

UNITED STATES PATENT OFFICE 2,475,456

MAGNETIC WORK HOLDER

Walter J. Norlander, Chicago, Ill.

Application August 24, 1944, Serial No. 551,043

3 Claims. (Cl. 175—367)

1

The present invention relates to a device by means of which articles of work may be conveniently held in position during machining operations and is more particularly concerned with that type of holder in which the work may be held by the application of magnetic power derived from a suitable source such as a magnetic chuck.

Magnetic chucks of conventional design and construction require work holding devices having a greater fineness of pole spacing or distribution than the underlying chuck surface when it is desired to hold relatively small or thin pieces of work with adequate security and continuity essential for machining operations.

Work holding devices of the type heretofore used for extending the use of magnetic chucks for machining operations on small or thin pieces of work have been composed of alternate laminations of magnetic and non-magnetic material of various thicknesses so as to provide holders that would not require registration with the chuck pole pattern beyond the necessity of keeping the holder in square alignment. In other words, when the work holding device of this character was applied on the working surface of the chuck, the poles of the chuck and the laminations of magnetic and non-magnetic material of the holding device were effective to conduct magnetic flux through the work piece only while said poles and laminations were maintained in parallel relation.

A work holding device of the type contemplated by the present invention consists of a suitably shaped body having its polar units so finely dispersed over the area of its work holding surface and the surface thereof cooperating with the working surface of the chuck as to provide rows of spaced polar units in registry with the polar pattern of the chuck face in any angular position of the holding device in a plane of rotation parallel to the face of the chuck in contact therewith.

A further object of this invention resides in the provision of a work holding device of the type indicated which embodies features of design and construction rendering the device inexpensive to manufacture, reliable in operation and not susceptible to derangements of parts incident to hard usage.

Further objects and advantages of the present invention will be apparent from the following description, reference being had to the accompanying drawings wherein a preferred embodiment of the present invention is clearly shown.

Fig. 1 is a perspective view of a V-block embodying the construction and arrangement of

2 polar units in a work holding device in accordance with the present invention.

Fig. 3 is a perspective view illustrating the arrangement of a pair of magnetic panels in operative assembled relation with a panel of non-magnetic material, and in which details of construction of the magnetic panels to provide a plurality of polar sections are shown.

Fig. 4 is a side elevational view of a magnetic panel with a dotted line portion to indicate a preferred arrangement of the polar sections of a similar panel with reference to the polar sections of the panel shown in full lines, when said panels are in operative assembly.

Fig. 5 illustrates the manner in which an article of work is adapted to be placed in circuit with the opposite poles of a magnetic chuck through a plurality of separated paths of magnetic flux as defined by the polar sections or units provided by a holder designed and constructed in accordance with this invention.

Figure 1:
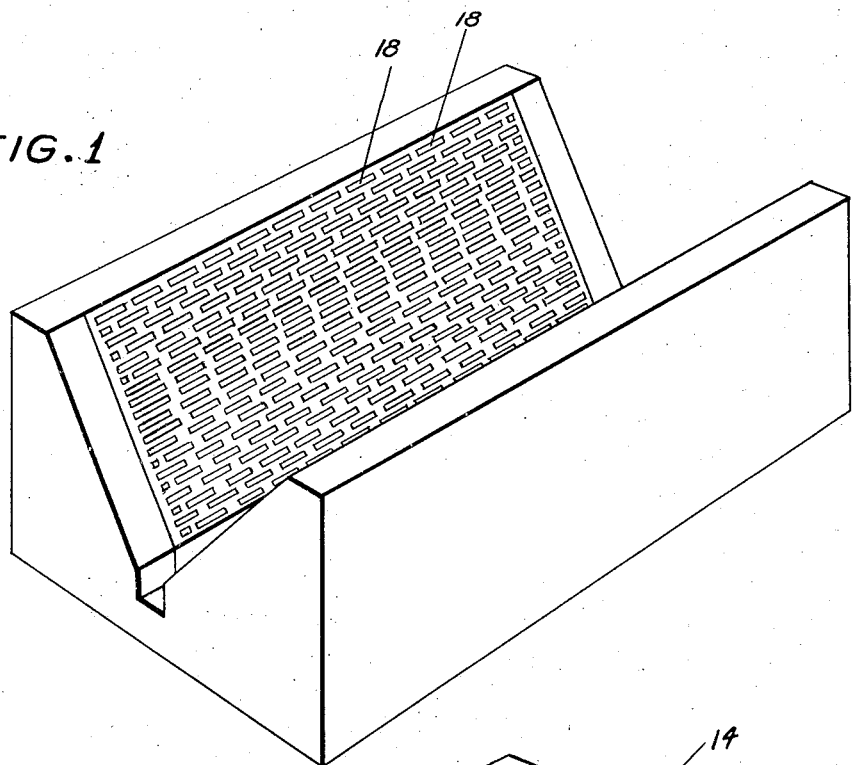

Referring now to the drawing, the reference numbers 10 and 11 designate the opposite poles of a chuck, as shown in Fig. 5, these parts being of the usual and well known magnetic chuck construction to which the present invention is applicable. The present invention finds applications in the fabrication of all types of work holding devices such as chuck parallels, auxiliary top plates, V-blocks and may also be formed as an integral part of a chuck. The construction of the work holder illustrated in the drawing is merely for the purpose of indicating one form of device embodying the principles of this invention.

Figure 2:
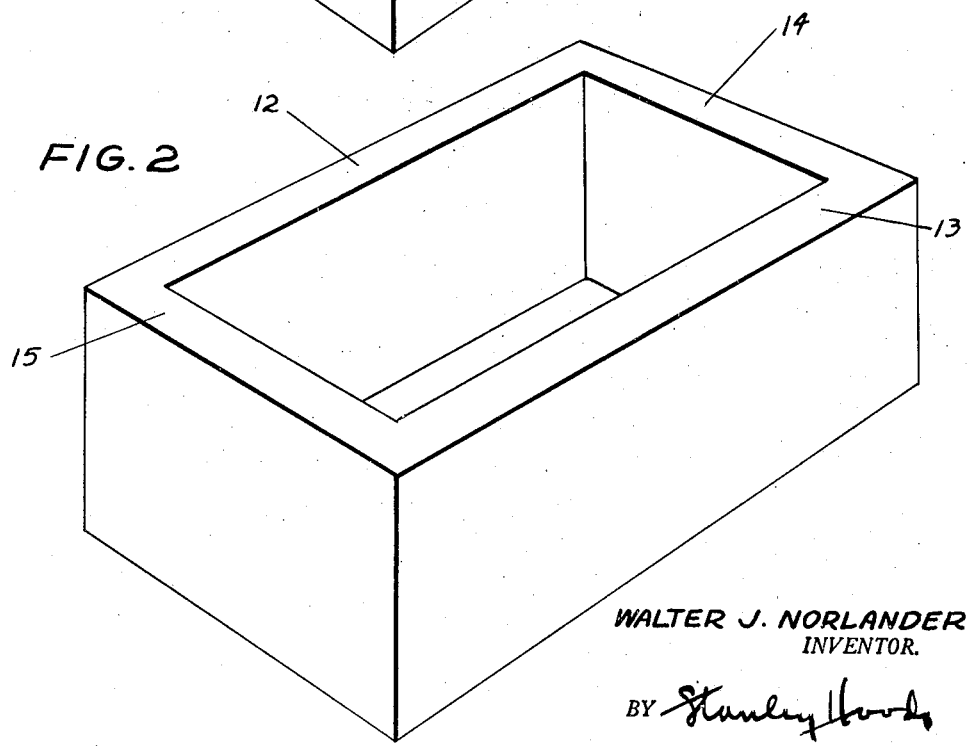
Fig. 2 is a perspective view of an open frame or casing member in which laminations of magnetic and non-magnetic panels are adapted to be packed and rigidly assembled to form polar units in accordance with this invention.

A V-block incorporating features of construction representing the application of the present invention is shown in Fig. 1 (or illustrating the article in a pre-finished condition as shown in Fig. 2) as consisting of an enclosing frame or casing consisting of spaced upright side walls 12 and 13 and spaced upright end walls 14 and 15 defining a rectangular enclosure. This frame or casing is preferably formed of suitable casting material, preferably of such character and quality as to provide a flame hardenable exterior surface.

Laminations of magnetic and non-magnetic material in the form of relatively thin panels or sheets 16 of ferrous composition separated by similar panels 17 of non-ferrous composition, such as copper, aranged as shown in Fig. 3, are adapted to be tightly packed within the space surrounded by the walls 12, 13, 14 and 15 of the enclosing frame shown in Fig. 2.

Each of the panels or sheets 16 are divided into a series of parallel spaced sections 18 by means of relatively thin straight slots 19 pointing toward the edges of the panel which ultimately extend cross-wise of the space between the walls of the enclosing frame. The slots 19 are preferably arranged on an inclination wherein the extremity of each slot 19 is offset laterally from its other extremity a distance approximately equal to one and one-half times the distance between each slot and either of its next adjacent slots as shown in Fig. 4. By arranging the panels 16 so that the slots 19 of each panel or, if desired, a predetermined group of neighboring panels, are in intersecting relation to the slots of its neighboring panel or group of neighboring panels, as shown in Fig. 4, the sections 18 form a series of branches which with respect to sections 18 of certain panels diverge from and with respect to sections 18 of certain other panels converge toward various points in planes corresponding to the planes defining the terminals or ultimately exposed ends of the sections 18 when the panels 16 are in final condition, as described hereinafter.

Preliminary to the step of arranging the panels 16 within the outer or enclosing frame shown in Fig. 2, copper is deposited to a suitable thickness over the entire surface of each panel 16 by means of electroplating or any other suitable method. The plated panels 16 and the solid panels 17, of copper, when in a packed state within the enclosing frame, are thereupon heated as a unit to a temperature sufficiently high to fuse the copper, causing the copper to fill the slots 19. When cool, the molten copper acts as a filler which holds the panels 16 and 17 in position with absolute rigidity, thus eliminating the necessity for separate fastening elements which might interfere with the efficiency of the sections 18 as polar units or otherwise bring about a condition in which the sections 18 are susceptible to derangement. The edges of the panels 16 and 17 are then ready to be trimmed in any suitable manner so as to expose the non-magnetic filler in the slots 19 and the edges of the panels 16 and 17 as well as the upper and lower limits of the walls 12, 13, 14 and 15 of the enclosing frame in a common plane consistent with the ultimate contour of the working holding device, such as the V-block shown in Fig. 1. Consequently, the area of the chuck contacting face and the work holding face of the block or holder is provided with a multiplicity of polar units which extend in several directions cross-wise of the holder, each of such units being screened or shielded from all other units by the copper filled slots 19 and the copper panels 17.

As shown in Fig. 5, the sections or polar units 18 provide courses for magnetic flow which lead toward and away from an area of the working face on such an angle as to provide a magnetic polar unit in contact with each of the poles of the chuck and the work piece 20 even though the work piece is too small to bridge the space between the poles 10 and 11 of the chuck.

By reason of the arrangement of the magnetic polar units 18 in the holder in sufficient number and in sufficiently closely spaced relation as indicated in the foregoing description, relatively small or thin pieces of work may be held with great security and continuity for machining operations in any angular position of the holder in a plane of rotation parallel to the cooperating faces of the chuck and holder when in operative arrangement.

It is to be understood that the form of this invention as shown herein is to be taken as a preferred example of the same and that certain changes in the shape, size, arrangement of parts, and method of construction, may be resorted to without departing from the spirit of the invention or the scope of the appended claims.

What is claimed is:

1. A work holder comprising a body of nonmagnetic material providing a base and an oppositely disposed work holding face, and means through which magnetic power may be caused to flow into a work piece positioned on said work holding face when the base is in contact with opposite poles of a magnetic chuck including a multiplicity of polar units arranged in uniformly closely spaced relation throughout said body and having their ends exposed in the plane of the work holding face and the base of the holder, a group of said polar units having the portions thereof intermediate their ends disposed in a plurality of parallel planes oblique to the plane of the base of said holder and a second group of said polar units having corresponding portions disposed in a plurality of parallel planes oblique to the plane of the base of said holder and intersecting the parallel planes common to the first group of polar units.

2. A work holder as defined in claim 1 wherein said work holding surface is of rectangular plan and of uniform V-shaped cross-sectional contour throughout one longitudinal dimension of said surface.

3. A work holder comprising a body of nonmagnetic material providing a base and an oppositely disposed work holding face, and means through which magnetic power may be caused to flow into a work piece positioned on said work holding face when the base is in contact with opposite poles of a magnetic chuck including a multiplicity of polar units arranged in uniformly closely spaced relation throughout said body and having their ends exposed in the plane of the work holding face and the base of the holder whereby said ends are arranged in rows extending in at least two directions throughout a substantial portion of the area of said work holding face and the base of the holder, the opposite ends of alternate rows of said polar units being disposed in parallel planes oblique to the plane of the base of the holder, and the opposite ends of other alternate rows of said polar units being disposed in parallel planes oblique to the plane of the base of the holder and intersecting the parallel planes common to the first named alternate rows of said polar units.

WALTER J. NORLANDER.

REFERENCES CITED

The following references are of record in the file of this patent:

UNITED STATES PATENTS

| Number | Name | Date |
|---|---|---|
| 1,254,664 | Downes et al. | Jan. 29, 1918 |
| 1,301,135 | Karasick | Apr. 22, 1919 |
| 1,895,129 | Jones | Jan. 24, 1933 |
| 2,104,472 | St. Clair | Jan. 4, 1938 |
| 2,401,887 | Sheppard | June 11, 1946 |